F. DENGLER.
Dumping Wagon.

No. 93,069.  Patented July 27, 1869.

Witnesses:  Inventor
  F. Dengler.
  by Prindle and Dyer Attys

United States Patent Office.

FRED. DENGLER, OF NORTH VERNON, INDIANA.

Letters Patent No. 93,069, dated July 27, 1869.

---

IMPROVEMENT IN DUMPING-CARTS.

---

The Schedule referred to in these Letters Patent and making part of the same.

---

To all whom it may concern:

Be it known that I, FRED. DENGLER, of North Vernon, in the county of Jennings, and in the State of Indiana, have invented certain new and useful Improvements in Dumping-Carts; and do hereby declare that the following is a full, clear, and exact description thereof, reference being had to the accompanying drawing, making a part of this specification, in which—

Figure 1:
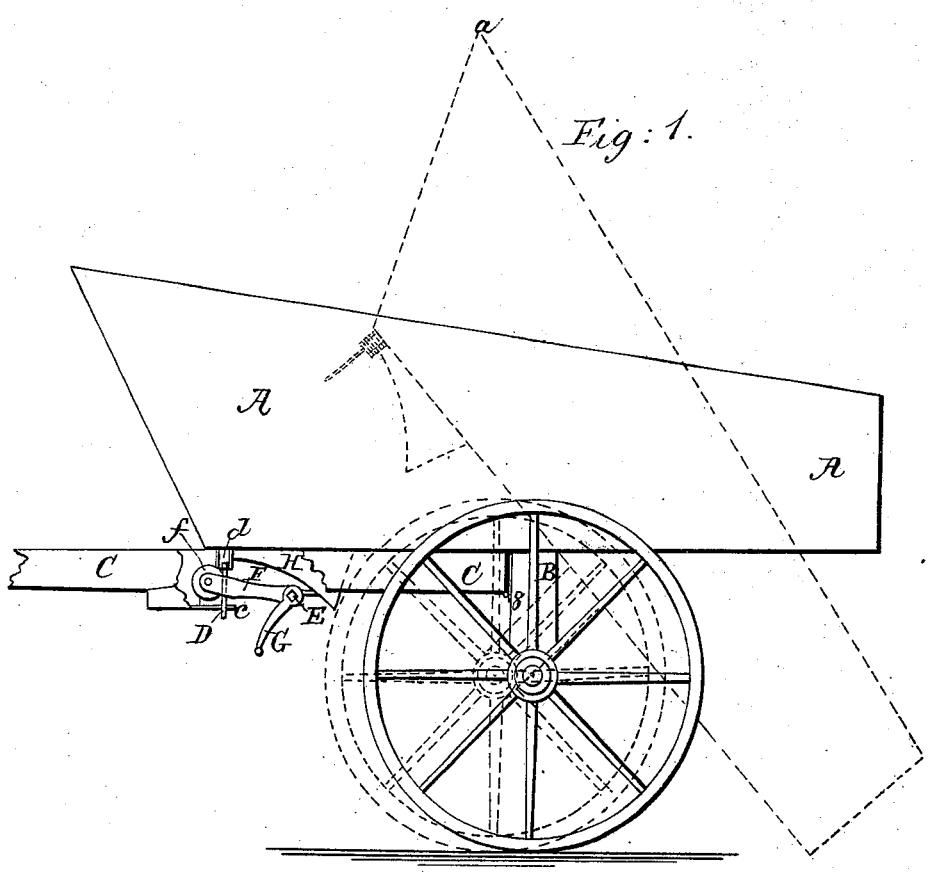
Figure 2:
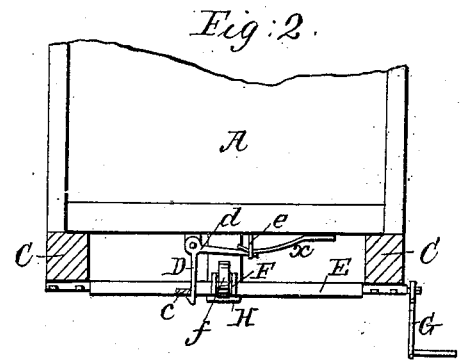

Figure 1 is a side elevation of my cart, with one shaft broken away, so as to show the dumping-devices, and Figure 2 is a front elevation of the same.

Letters of like name and kind refer to like parts in each of the figures.

My invention relates to a class of carts which is so constructed as to permit the box thereof to be tilted for the purpose of dumping its contents; and It consists in the construction and arrangement of the locking and releasing-devices, by means of which said box may not only be released, but tilted over by one movement of a crank, as is hereinafter fully described.

In the annexed drawing, A represents the box of a cart resting upon and secured to an axle, B, which is provided with wheels in the usual manner.

The shafts C C are hinged at their lower back edge to the axle, so that while furnishing a support for the front part of the box A, when it occupies a horizontal position, they shall permit its rear end to be tilted down, as shown by red lines in fig. 1, without changing their position with reference to the ground.

The heaviest portion of the box A is forward of the axle, and it is expected that the load will be similarly arranged; but in order that said box may not be accidentally tilted, its front end is locked down by means of a catch, D, which is pivoted upon the lower side of said box at the front end, and engages with an iron plate or detent, c, secured upon the cross-bar of the shafts.

The catch D has an arm, d, placed at a right angle thereto, and extending in a lateral direction beneath the box, where it is provided with a guide, a, which allows sufficient vertical motion to enable said catch to be released from engagement with the detent-plate c.

A spring, x, is secured to the box A, and caused to press against said arm, so as to hold the catch firmly against the plate a, except when said catch is released by the hand.

By this arrangement, the box A may be securely held in an upright position or released and tilted over, as desired; but as it would be inconvenient to operate the catch by hand, and as the weight of the load in front of the cart would often be so great as to require an expenditure of considerable force to raise the front end and dump the load, the following-described means are furnished for the more easy accomplishment of these results than by the unaided efforts of the driver.

A shaft, E, extends laterally across the shafts C C, and is pivoted in suitable bearings upon their lower side.

An arm, F, secured to, and forming a part of said shaft, extends forward, and has pivoted within its outer end, a roller, f, with its axis parallel to said shaft, which is so arranged as to bring said roller beneath and slightly forward of the arm d, so that when the shaft is revolved, by means of the crank G, so as to throw the said arm, F, upwards, the catch D shall be released.

Secured longitudinally upon the under side of the box A, and immediately in rear of the arm d, is a block, H, the under side of which curves backward and downward, and furnishes a bearing for the roller f, so that when the shaft E is revolved backwards, said roller is caused to bear against said block and raise the front end of the box, until said box is overbalanced and tilts over.

It will be seen that when the crank is turned backwards, the roller first strikes against the arm d and releases the catch, and then raises the front end of the box, performing both operations with certainty and ease, and it is believed that from the simplicity, convenience, and durability of the various parts of this device, it is superior to any now in use intended for a like purpose.

Having thus fully set forth the nature and merits of my invention,

What I claim as new, and desire to secure by Letters Patent, is—

The catch D, when constructed and arranged as described, and released by means of the roller f, substantially as and for the purpose shown.

Also, the shaft E, provided with the arm F and roller f, and operated by means of the crank G, in combination with the catch D and curved block H, substantially as shown, and for the purpose specified.

Also, the within-described devices for locking, releasing, and tilting the box of a dumping-cart, consisting of the catch D, provided with the arm d and spring x; the shaft E, actuated by means of the shaft G, and provided with the arm F and roller f, which operate upon the curved block H, all constructed and arranged substantially as and for the purpose specified.

In testimony that I claim the foregoing, I have hereunto set my hand, this 12th day of April, 1869.

FRED. DENGLER.

Witnesses:
 ABRAHAM DOLL,
 TANK. R. MAYFIELD.